UNITED STATES PATENT OFFICE.

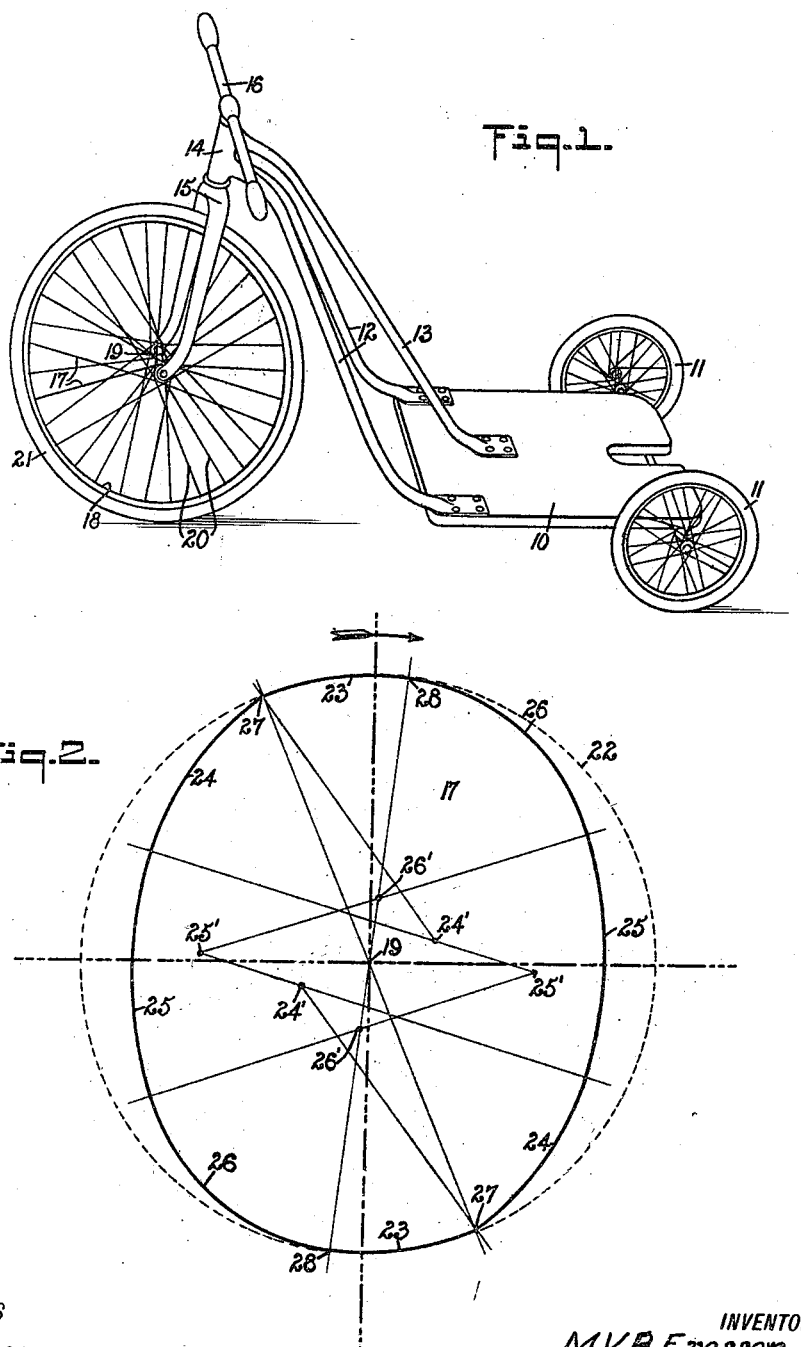

MARTIN V. B. EVESSON, OF JERSEY CITY, NEW JERSEY.

GALLOPING-WHEEL.

1,256,454.

Specification of Letters Patent.  Patented Feb. 12, 1918.

Application filed June 7, 1917.  Serial No. 173,345.

*To all whom it may concern:*

Be it known that I, MARTIN V. B. EVESSON, a citizen of the United States, and resident of Jersey City, in the county of Hudson and State of New Jersey, have invented a new and Improved Galloping-Wheel, of which the following is a full, clear, and exact description.

This invention relates to toy vehicles and has particular reference to vehicles adapted to be propelled by a child while riding thereon.

Among the objects of the invention is to improve devices of this nature with reference especially to the form and action of the main wheel.

Another object of the invention is to provide a child's vehicle having a plurality of wheels, at least one of which has a rim or tread portion of an elliptical or elongated form as distinguished from the regular circular form, the vehicle together with the wheel being so designed that a child, by a skilful shifting of his weight or position on the vehicle, is enabled to propel the same at considerable velocity and with not very much expenditure of energy.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view showing a suggestion as to the adaptation of my invention in a complete vehicle; and Fig. 2 is a diagram indicating the preferred form of the propelling wheel, the arrow indicating the direction of movement of the wheel to produce the best results.

Referring now more particularly to the drawings I show at 10 a vehicle body or platform having journaled upon the rear end thereof one or more circular supporting wheels 11 of usual or conventional form or construction. To the front portion of the platform are braces 12 and 13 secured in any suitable manner, and extending upwardly and forwardly where they merge into a tubular head 14 in which is journaled a fork 15 having at its upper end any suitable steering device such as a handle bar 16. Journaled in this fork 15, for free rotation, is a wheel 17 having a peculiar form of tread but otherwise being constructed in any suitable or convenient manner and with which this patent is in no way particularly concerned. Preferably, however, each of the wheels 17 comprises a rigid rim 18, a hub 19, spokes 20 between the rim and the hub, and a cushion or resilient tire 21.

Referring now to Fig. 2 it will be observed that the form of the wheel tread, as represented by the heavy black line, approximates an ellipse, but in its preferred design or form it is not a true geometric ellipse. The center of the wheel representing the axis of the hub is indicated at 19, and the dotted circle 22 represents a true circle concentric with the hub 19 and having a radius equal to the longer axis of the elliptical figure. In other words the spaces between the dotted circle and the elliptical line represent the amount of eccentricity incident to my construction. At this point I wish to be understood as providing a wheel of such form that when the vehicle is propelled in such a manner as to cause the main or driving wheel to roll from one of the highest arcs it will tend to plunge, or cause the vehicle and rider to plunge forwardly with considerable impetus, this impetus being augmented by the rider throwing his weight forwardly upon the platform and handle bar will serve to continue the rolling of the wheel bringing it up to and beyond the next arc of maximum radius. While the wheel is rolling up to the arc of greater radius again the rider will shift his weight rearwardly to facilitate such rolling action and to prepare for a subsequent forward pitch or shift of his weight when another plunge is to be taken. In other words the rider will give his body more or less of a backward and forward oscillation for every rise of the main wheel up to its highest point and rotation therefrom while making the more or less sudden downward plunge toward the arc of the wheel having the shortest radius.

Examining now the diagram more minutely it will be observed that I provide two circular arcs 23 having their centers coincident with the axis 19 and over which the wheel rolls in succession just the same as if the wheel were circular. Next to each of these arcs 23 is an arc 24 whose center is at 24'. Following this arc is another arc 25 whose center is at 25', and between the arcs 25 and 23 is another arc 26 whose center is at 26'. But for the concentric arcs 23 the periphery of the wheel would closely approximate but would not quite be a true ellipse, but it is to be noted that the points 24' are more eccentric than the points 26' whereby with the wheel rolling from an arc 23 on to an arc 24 the impetus will be more pronounced than if the wheel were to be rotated in the opposite direction. In other words with the wheel rolling from the arc 23 to the arc 24 the vehicle will be given a forward and downward plunge from which it will recover with comparative ease and smoothness rolling along the arcs 25 and 26 until it rolls upon the next concentric arc 23. Because of the disparity of the eccentricities of the points 24' and 26' there is a more pronounced angle at 27 between the arcs 23 and 24 than there is between the arcs 26 and 23. Since, however, the wheel rolls from the arc 23 to the arc 24 having the greatest eccentricity for the purpose of giving a decided plunge or impetus to the vehicle, no objection in practice is experienced to the angle at 27. In the construction of the wheel, however, as shown, there is formed no perceptible angle at 28 so that from that point in the arc 25 having the shortest radius with respect to the axis 19, the wheel may roll up with an easy gradual rise until it rolls upon and over the next arc 23.

The eccentric portions of the wheel on opposite sides of the longer diameter are preferably symmetrical, that is to say the rolling effect at each half rotation of the wheel is the same as during the next half rotation. In this connection I wish to observe that in some instances it may be preferred to provide a wheel having only one of the plunging or accelerating arcs and a single gradual rise therefrom around to the arc having its center coincident with the axis of the wheel. In this case the concentric arc may be of any suitable extent.

Of the elliptical portion of the wheel, namely, between the points 27 and 28, the main features are the eccentric arcs 24 and 26, the diagram indicating the arc 25 merely as an incident to connect the arc 24 easily and smoothly to the arc 26.

I claim:

1. The herein described toy or pleasure vehicle comprising a platform, rolling means to support the rear end of the platform and a wheel supporting the front end of the platform, the wheel being so constructed as to rotate around a point within the wheel and being flattened on one side and comprising a plurality of relative eccentric arcs of differing eccentricities.

2. In a pleasure vehicle, the combination of a body, rolling means to support one end of the body and a propelling wheel supporting the other end of the body, said wheel having a portion of its periphery concentric of the axis of the wheel around which it turns and having next adjacent to said concentric arc an eccentric arc of short radius, and then rolling in turn over an eccentric arc of less eccentricity.

3. In a pleasure vehicle, the combination of a body adapted to support a child, a steering fork, a frame extending from one end of the body and in which the fork is journaled, a steering device connected to the fork, rolling means to support one end of the body and a propelling wheel journaled for rotation around its center in said fork, said wheel having a periphery comprising two oppositely arranged arcs concentric with the axis of the wheel, and the end of each of these arcs being connected to the beginning of the next succeeding similar arc by means of a continuous curve composed of independent arcs of different degrees of eccentricity.

4. The herein described wheel for pleasure vehicles, the same comprising a periphery including an arc concentric with the axis of the wheel, the wheel being adapted to roll from this concentric arc on to an arc of maximum eccentricity down to the shortest radius, and thence roll on to another arc adapted to lift the wheel with a gradual rise and less eccentricity.

5. The herein described wheel for pleasure vehicles, the same comprising a periphery including a series of arcs arranged in the following order: first, a circular arc and then a plurality of eccentric arcs the last of which is the least eccentric, the circular arc being the farthest from the axis of the wheel.

MARTIN V. B. EVESSON.

Copies of this patent may be obtained for five cents each, by addressing the "Commissioner of Patents, Washington, D. C."